United States Patent [19]

Panush

[11] Patent Number: 4,487,869

[45] Date of Patent: Dec. 11, 1984

[54] SUPER JET BLACK COATINGS

[75] Inventor: Sol Panush, Farmington Hills, Mich.

[73] Assignee: Inmont Corporation, Clifton, N.J.

[21] Appl. No.: 535,020

[22] Filed: Sep. 23, 1983

[51] Int. Cl.$^3$ ................................................. C08K 5/34
[52] U.S. Cl. ..................................... 524/90; 523/508;
524/560; 524/601; 524/604
[58] Field of Search .......................................... 524/90

[56] References Cited

U.S. PATENT DOCUMENTS 4,299,906  11/1981  Liu ....................................... 430/285
4,303,924  12/1981  Young ................................. 427/54.1

FOREIGN PATENT DOCUMENTS 49-108202  10/1974  Japan ..................................... 524/90

Primary Examiner—Lewis T. Jacobs
Attorney, Agent, or Firm—Harry J. Gwinnell

[57] ABSTRACT

A coating composition is described comprising a 1:2 chromium complex of a mono-AZO dye substituted with amino-phenol and coupled with a 2-napthol in a thermosetting resin system. The composition when applied to a substrate imparts a super jet black coating which is non-bleeding, unaffected by the dispersion method or vehicle used, and is durable to the elements.

3 Claims, No Drawings

SUPER JET BLACK COATINGS

DESCRIPTION

1. Technical Field

The field of art to which this invention pertains is coating compositions, coating methods, and the resultant coated articles.

2. Background Art

Conventional jet black automotive pigments are subject to significant variations in jetness. By jetness is meant a true blue-black color with depth and clarity totally void of haziness and/or conflicting undertones of red, yellow or brown. The color development of a high color carbon black is dependant on the vehicle used to disperse the pigment (e.g., of dispersing vehicles, thermosetting acrylic copolymers, butylated melamines, polyester resins, alkyl resins, polymethanes, etc.). The structure and immense surface area of the high color carbon blacks require a very mobile (good wetting) vehicle which will extend itself to wet and encapsulate the pigment (individual particles and submicron agglomerates) during the dispersion process. Not all vehicles are capable of being extended to fully wet and encapsulate these pigments resulting in varying degrees of color development (jetness). The particular dispersion vehicle selection is governed by the finished enamel system, and optimum color development (jetness, clarity, depth) cannot always be obtained. The dispersion method (steel ball mil, attritor, etc.) requires formulation changes to optimize the efficiency of the specific equipment. However, the dispersion method is secondary to the vehicle of optimum jetness and depth. Substitution of the dispersion vehicle to enable such jet black automotive pigments to be compatible with various automotive paints systems (e.g., thermosetting acrylics, urethanes, thermoplastic acrylics, etc.) and/or altering the dispersion methods (e.g., steel ball mill, attritor, etc.) will result in variations in jetness ranging from deep blue-black to milky red-brown. As can be appreciated, such variations in predictability for jet black automotive pigments is not a desirable feature.

All such pigments, which develop color and transparency as a product of the dispersing procedure also generally are lacking in chroma and purity of color. Since the pigment agglomerates cannot be reduced to discrete particles, gloss and distinctness of image are adversely affected. Furthermore, convention dyes also have a tendency to naturally "bleed" from the polymer systems resulting in a gradual change of color of lessening jetness.

Accordingly, what is needed in this art is an improved coating composition and coating system of consistent color regardless of the dispersion method or vehicle used which can provide durable, universal jetness.

DISCLOSURE OF INVENTION

A super jet black coating composition is disclosed comprising a polymer composition containing at least about 25% by weight based on total polymer content of the composition of a thermosetting polymer and at least about 5% by weight based on solids content of the composition of a hydroxy-AZO complex dye. The dye is a 1:2 chromium complex of a mono-AZO dye substituted with amino-phenol coupled with 2 napthol. This dye is generally identified as CI (Color Index) Solvent Black No. 29. This dye is commercially available under the name Orasol ® Black RL from Ciba-Geigy Corporation. The use of such dye in such system produces a consistent deep blue-black jetness regardless of the dispersion method or the vehicle used. When incorporated into the thermosetting polymer containing composition and subjected to heat sufficient to cure the thermosetting polymer the dye "reacts" with the polymer becoming an integral part of the system eliminating the natural "bleeding" tendency of the dye and becoming insoluble in the enamel. This dye dissolves in solvent, like "true" conventional dyes but reacts like a "true" pigment when added to the enamel, becoming coated and protected by the polymer system. It is in this unity with the polymer system that the "reaction" with the polymer occurs. Conventional dyes never become part of the enamel. They remain free and exposed to "bleeding" (sensitivity to attack from solvents, enamels, etc., coming in contact with them). It is postulated that the chromium ion complex takes part in the catalyzed thermosetting reaction yielding a tightly knitted, non-bleeding system.

Another aspect of the invention includes a substrate material having coated thereon at least one layer of the above-described coating composition.

A multilayer coated article is also described including a base coat of the above-described coating composition overcoated with a clear thermosetting or thermoplastic top coating or such top coating additionally containing iron oxide encapsulated mica particles.

Another aspect of the invention includes a method of coating a substrate by depositing the above-described coating composition and optionally, the above-described top coats.

By utilizing the compositions and processes of this invention, not only are more brilliant, consistent, deep blue-black coatings produced but jet black coatings which are durable to the elements as well.

The foregoing and other features and advantages of the present invention will become more apparent from the following description.

BEST MODE FOR CARRYING OUT THE INVENTION

While any substrate material can be coated with the coating compositions according to the present invention, including such things as glass, ceramics, asbestos, wood, and even plastic material depending on the specific drying and/or curing requirements of the particular composition, the coating system of the present invention is particularly adapted for metal substrates, and specifically as an automotive paint finish system. The substrate may also be bare substrate material or can be conventionally primed, for example, to impart corrosion resistance. Exemplary metal substrates include such things as steel, aluminum, copper, magnesium, alloys thereof, etc. The components of the composition can be varied to suit the temperature tolerance of the substrate material. For example, the components can be so constituted for air drying (i.e., ambient), low temperature cure (e.g., 150° F.—180° F.), or high temperature cure (e.g., over 180° F.).

The polymer vehicle containing the hydroxy-AZO complex must contain at least about 25% by weight (based on total weight of polymer) of a thermosetting polymer system, including cross-linking agent. This insures the insolubility of the hydroxy-AZO complex in the enamel, color durability and lack of bleeding. For convenience this polymer vehicle containing the hydroxy-AZO complex will be referred to as the basecoat material. It should be understood, however, that it is not necessary to put a topcoat material on this basecoat, i.e., the basecoat can represent the entire polymer coating on the substrate.

The basecoat material can include any suitable film forming material conventionally used in this art including acrylics, alkyds, polyurethanes, polyesters and aminoplast resins. Although the basecoat can be deposited out of an aqueous carrier, it is preferred to use conventional volatile organic solvents such as aliphatic, cycloaliphatic and aromatic hydrocarbons, esters, ethers, ketones and alcohols including such things as toluene, xylene, butyl acetate, acetone, methyl isobutyl ketone, butyl alcohol, etc. When using volatile organic solvents, although it is not required, it is preferred to include from about 2% to about 50% by weight of a cellulose ester and/or wax (e.g., polyethylene) which facilitates quick release of the volatile organic solvent resulting in improved flow or leveling out of the coating. The cellulose esters used must be compatable with the particular resin systems selected and include such things as cellulose nitrate, cellulose propionate, cellulose butyrate, cellulose acetate butyrate, cellulose acetate propionate, and mixtures thereof. The cellulose esters when used are preferably used in about 5% to about 20% by weight based on film forming solids.

The acrylic resins in the basecoat (in excess of the required 25% thermosetting) may be either thermoplastic (acrylic lacquer systems) or thermosetting. Acrylic lacquers such as are described in U.S. Pat. No. 2,860,110 are one type of film forming composition useful according to this invention in the basecoat. The acrylic lacquer compositions typically include homopolymers of methyl methacrylate and copolymers of methyl methacrylate which contain among others, acrylic acid, methacrylic acid, alkyl esters of acrylic acid, alkyl esters of methacrylic acid, vinyl acetate, acrylonitrile, styrene and the like.

When the relative viscosity of the acrylic lacquer polymer is less than about 1.05, the resulting films have poor solvent resistance, durability and mechanical properties. On the other hand, when the relative viscosity is increased above the 1.40 level, paints made from these resins are difficult to spray and have high coalascing temperatures.

Another type of film forming material useful in forming the basecoat of this invention is a combination of a crosslinking agent and a carboxy-hydroxy acrylic copolymer. Monomers that can be copolymerized in the carboxy-hydroxy acrylic copolymer include esters of acrylic and methacrylic acid with alkanols containing 1 to 12 carbon atoms, such as ethyl acrylate, methyl methacrylate, butyl acrylate, butyl methacrylate, 2-ethylhexyl acrylate, lauryl methacrylate, benzyl acrylate, cyclohexyl methacrylate, and the like. Additional monomers are acrylonitrile, methacrylonitrile, styrene, vinyl toluene, alpha-methyl styrene, vinyl acetate, and so forth. These monomers contain one polymerizable ethylenically unsaturated group and are devoid of hydroxyl and carboxylic groups.

The crosslinking agents used in combination with the hydroxy-carboxy copolymers are those compositions which are reactive with hydroxy and/or carboxylic acid groups. Examples of such crosslinking agents are polyisocyanates (typically di- and/or tri- isocyanates) polyepoxides and aminoplast resins. Particularly preferred crosslinking agents are the aminoplast resins.

The polyisocyanates when reacted with hydroxyl bearing polyester or polyether or acrylic polymers will yield urethane films useful in the process of this invention in both the basecoat and topcoat. The isocyanate (-NCO)-hydroxyl (-OH) reaction takes place readily at room temperature, so that ambient and low temperature cure is possible.

Among other basecoats which are typically used in the processes of the present invention are those commonly known as alkyd resins which are defined to include fatty acid or oil containing esterification products. The methods for preparing these resins are well known in the art.

The preferred alkyd resins useful in this invention are those containing from about 5 to about 65 weight percent of a fatty acid or oil and having an hydroxyl equivalent ratio of from about 1.05 to 1.75. Alkyd resins having less than about 5% fatty compound are classified as the "oil-less" alkyd resins or polyester resins described hereinafter. On the other hand, alkyd resins containing greater than 65% of a fatty compound exhibit poor baking properties, poor chemical resistance and unsatisfactory adhesion to either the basecoat or the substrate. When the hydroxyl to carboxyl equivalent ratio is less than about 1.05 gelation can result during polymer preparation while resins prepared having a ratio in excess of 1.75 have low molecular weights and therefore poor chemical resistance.

These alkyd resins can also be used as the topcoat of this invention. When this is the case it is preferred that the oil or fatty acid portion of the alkyd resin contain a light colored baking oil or fatty acid such as coconut or dehydrated castor oils or fatty acids. Furthermore, when these resins are used as topcoats they can be reacted with various acrylic or ethylenically unsaturated monomers as described above to produce vinyl modified alkyd resins.

Curing of these alkyd resins can be accomplished by blending with any of the previously described crosslinking agents in the same weight ratios as are used with carboxy-hydroxy copolymers.

Included among the various fatty acids and oils useful in preparing these alkyd resins are the fatty acids derived from the following oils; castor, dehydrated castor, coconut, corn, cottonseed, linseed, oticica, perilla, poppyseed, safflower, soybean, tung oil, etc., and the various rosins containing tall oil fatty acids. Useful polyols include the various glycols, such as ethylene glycol, propylene glycol, neopentyl glycol, butylene glycol, 1, 4 butanediol, hexylene glycol, 1,6 hexanediol, the polyglycols such as diethylene glycol or triethylene glycol, etc.; the triols such as glycerine, trimethylol ethane, trimethylol propane, etc., and other higher functional alcohols such as pentaerythritol, sorbitol, mannitol, and the like. Acids useful in preparing the alkyd resins of this invention include monofunctional acids such as rosin acids, benzoic acid, para tertiary butyl benzoic acid and the like; the polyfunctional acids such as adipic acid, azelaic acid, sebacic acid, phthalic acid or anhydride, isophthalic acid, terephthalic acid, dimerized and polymerized fatty acids, trimellitic acid, and the like.

Yet another useful basecoat is prepared using nonaqueous dispersions such as are described in U.S. Pat. Nos. 3,050,412; 3,198,759; 3,232,903; 3,255,135. Typically, these dispersions are prepared by polymerizing a monomer such as methyl methacrylate in the presence of a solvent in which polymers derived from the above monomer are insoluble and a precursor which is soluble in the solvent. Non-aqueous dispersions can have a relative solution viscosity as previously defined of about 1.05 to 3.0. Dispersions having a relative solution viscosity in excess of about 3.0 are difficult to spray and have high coalescence temperatures while dispersions with a relative solution viscosity less than about 1.05 have poor resistance, durability and mechanical properties. The monomers useful in preparing the above dispersed copolymers or homopolymers are those listed previously as useful in forming the carboxy-hydroxy acrylic copolymers.

In another instance the basecoat film can be produced from resins known as polyesters or "oil-less" alkyd resins. These resins are prepared by condensing non-fatty containing polyols and polyacids. Included among the useful polyacids are isophthalic acid, phthalic acid or anhydride, terephthalic acid, maleic acid or anhyride, fumaric acid, oxalic acid, sebacic acid, acelaic acid, adipic acid, etc. Mono basic acids such as benxoic, para tertiary butyl benzoic and the like can also be utilized. Among the polyalcohols are the diols or glycols such as propylene glycol, ethylene glycol, butylene glycol, 1, 4 butanediol, neopentyl glycol, hexalene glycol, 1, 6-hexanediol, and the like; the triols such as trimethylol ethane, trimethylol propane and glycerine and various other higher functional alcohols such as pentaerythritol.

Any of the above-recited polymers may also be used as topcoats, as long as it provides a transparent film. The term "transparent film" is defined as a film through which the basecoat can be seen. It is preferred that the transparent film contain a UV absorbing compound and/or a hindered amine UV stabilizer and be substantially colorless so that the full polychromatic and aesthetic effect of the basecoat is not substantially decreased. An outstanding feature the inclusion of a topcoat provides is the significant improvement in the durability which is provided to the overall coating composition. The use of a topcoat which covers the basecoat also provides the opportunity to utilize iron oxide encapsulated mica pigments (Richelyn ® pigments, Inmont Corporation) in the topcoat.

The iron oxide encapsulated mica pigments according to the present invention are commercially available from the Mearl Corporation and EM Chemicals, and range in color from golden bronze at the thinnest iron oxide encapsulation through copper, to red at the thickest iron oxide encapsulation. The iron oxide coatings on these pigments being transparent act as natural ultraviolet absorbers. For additional exterior durability (e.g., exposure to the sun) minor amounts of other additives such as chromium hydroxide and titanium dioxide may be included in the iron oxide encapsulation layer. It should also be noted that other high temperature stable metal oxides (such as copper, calcium, cadmium, cobalt, barium, strontium, manganese, magnesium and lithium) can be substituted in whole or in part for the encapsulating iron oxide. The iron oxide encapsulation layer is generally in the molecular range of thicknesses representing about 10% to about 85% by weight of the total weight of the encapsulated mica particle, preferably about 20% to about 60%, and typically about 29% to about 48% by weight. If additives such as titanium dioxide or chromium hydroxide are used as part of the encapsulation layer, they are generally present in an amount of about 1% to about 35% by weight, and typically about 2% to about 5% for the titanium dioxide, and about 0.1% to about 3.5% by weight for the chromium hydroxide, based on total weight of the encapsulated particle.

The iron oxide encapsulated mica pigments are carefully screened and controlled particles, all within about 5 microns to about 60 microns (preferably about 5 microns to about 45 microns, and typically about 5 microns to about 35 microns) in their largest dimension, and about 0.25 micron to about 1.0 micron in thickness. The closely controlled particle size provides the transparent, translucent, reflective and refractive features establishing improved aesthetic and physical properties of these coatings.

The unique aesthetics of such topcoat system require the iron oxide encapsulated mica in the topcoat to be randomly located throughout the depth, width, and length of the clear film. In conjunction with the random distribution, the mica must also be randomly oriented off both the vertical and horizontal axes. This distribution and orientation assures the visibility of the mica regardless of the viewing angle (90° acute or obtuse). While this is in some degree a function of the particular coating method utilized, it is also a function of the size and constitution of the particle as described above. A Ransburg turbobell electrostatic sprayer is particularly suitable for such applications of the transparent topcoat film containing the iron oxide encapsulated mica.

A big advantage of such a transparent topcoat system is the extremely low pigment to binder ratio of iron oxide encapsulated mica necessary to produce improved, unique, aesthetic effects and protective qualities. Typical pigment to binder ratios range from about 0.0001 to 0.32 (by weight) and preferably about 0.001. The iron oxide encapsulated mica particles in the topcoat also provide a multiplicity of prismatic variation both due to the presence of the particles in the topcoat and due to the light reflective and refractive properties of the particles themselves, i.e., the individual layers on the mica particles.

Another advantage of such topcoat system is the durability of the coating. The iron oxide encapsulated mica particles are natural ultraviolet light absorbers. This provides protection not only to the polymer base but the organic and inorganic pigments as well. For automobile use this provides extended weathering durability. Note U.S. patent application Ser. No. 526,724 filed Aug. 26, 1983, entitled "Multilayer Automotive Paint System", the disclosure of which is incorporated by reference.

Three iron oxide encapsulated mica pigments are typically used in the topcoats. A Golden Bronze Richelyn pigment comprises 62%–68% mica, 29%–35% iron oxide ($Fe_2O_3$), 3%–5% titanium dioxide ($TiO_2$) and 0.3%–0.9% chromium hydroxide ($Cr(OH)_3$). A Red Richelyn pigment comprises 49%–55% mica, 42%–48% iron oxide, 2%–4% titanium dioxide, and 0.3%–0.9% chromium hydroxide. A Copper Richelyn pigment comprises 51%–57% mica, 40%–46% iron oxide, 3%–5% titanium dioxide and 0.3%–0.9% chromium hydroxide. All percents are by weight based on the total weight of the encapsulated pigment. The Golden Bronze Richelyn pigment contains a relatively thin layer of iron oxide encapsulation, the Red Richelyn pigment contains a relatively thick layer of iron oxide encapsulation, and the Copper Richelyn pigment contains a layer of iron oxide encapsulation which is somewhere in between.

Both the basecoat and the optional topcoat can be applied by any conventional method in this art such as brushing, spraying, dipping, flow coating, etc. Typically, spray application is used especially for automotive finishing. Various types of spraying can be utilized such as compressed air spraying electrostatic spraying, hot spraying techniques, airless spraying techniques etc. These can also be done by hand or by machine.

Prior to application of the coating materials of the present invention a conventional corrosion resistant primer typically has already been applied. To this primed substrate is applied the basecoat. The basecoat is typically applied from about 1.2 mils to about 3.0 mils if applied as a sole-coat and from about 0.4 mil to about 2.0 mil and preferably about 0.5 mil to about 0.8 mil if applied in conjunction with a topcoat. This thickness can be applied in a single coating pass or a plurality of passes with very brief drying ("flash") between applications of coats.

Once the basecoat has been applied the optional transparent overcoat should be applied after allowing the basecoat to flash at ambient temperature for about 30 seconds to about 10 minutes, preferably about 1 to about 3 minutes. While the basecoat can be dried for longer periods of time, even at higher temperatures, a much improved product is produced by application of the transparent topcoat after only a brief flash. Some drying out of the basecoat is necessary to prevent total mixing of the basecoat and topcoat. However, a minimal degree of basecoat-topcoat interaction is desirable for improved bonding of the coatings. The topcoat is applied thicker than the basecoat (preferably about 1.8 to 2.3 mils) and can also be applied in a single or multiple pass.

If a topcoat is applied, the system is again flashed for 30 seconds to 10 minutes, and in either case the total coatings are baked at temperature sufficient to drive off all of the solvent and cure and cross-link the thermosetting polymer. These temperatures can range anywhere from ambient temperature to about 400° F. Typically, temperatures of about 225° F. to about 280° F. (e.g., 250° F.) are used, (e.g., for about 30 minutes).

In order to impart the improved super jet black properties of the coating of the present invention at least about 5% of the hydroxy-AZO complex must be used. Conventional carbon black can also be used to impart the black color. Naturally, the hydroxy-AZO complex can represent the entire dye composition.

The following examples are illustrated of the principles and practice of this invention although not limited thereto. Parts and percentages where used are parts and percentages by weight.

EXAMPLE 1

62.40 parts (by weight solids) of thermosetting acrylic in solution, 35.25 parts of melamine resin, 2 parts of an ultraviolet absorber (e.g., CibaGeigy Tin Uvin 328) and 0.35 part of an acid converter (e.g., para-toluene sulfonic acid based) were combined with 100 parts of Orasol RL. Enough solvent was present in the composition to result in 57.05% solid polymer vehicle and 2.65% pigment, for a total non-volatile content of 59.70%. The pigment to binder ratio was 0.046. Utilizing a conventional electrostatic spraying device a 2.0 mil thick coating was applied to Bonderized ® (Hooker Chemicals & Plastics Corporation) steel panels primed with a cured corrosion resistant primer. The thus coated substrate was baked at 250° F. for 30 minutes.

EXAMPLE 2

A coating composition comprising 59.5 parts (by weight solids) of thermosetting acrylic resin in solution, 25 parts melamine resin, 15 parts cellulose acetate butyrate, and 0.5 part ultraviolet absorber, was combined with 100 parts Orasol RL. The resulting coating composition represented 33% solid polymeric vehicle, and 2% pigment for a total of 35% nonvolatile components. The pigment to binder ratio was 0.06. Bonderized steel panels primed with a cured corrosion resistant pimer were sprayed with the basecoat paint composition to a film thickness of 0.5 mil on dry film basis. After a flash of approximately 2 minutes at room temperature, an additional 0.5 mil film of the basecoat paint composition again as measured on a dry film basis was applied by spraying. After a 2 minute flash at room temperature a transparent topcoating was applied by spraying to a film thickness of dry basis of 1 mil. The transparent topcoating composition was prepared by blending 62.4 parts (by weight solids) thermosetting acrylic resin in solution, 33.6 parts melamine resin, and 4.0 parts ultraviolet absorber. After a 2 to 5 minute flash time at room temperature, the coating was baked at 190° F. for 15 minutes. The coating was then sanded with 600 sandpaper and water to smooth the coating and to remove surface imperfections. After rinsing with mineral spirits the coating was baked at 250° F. for 30 minutes.

In both instances a deep blue-black coating resulted.

As demonstrated by the above, not only does the hydroxy-AZO complex dye have universal compatibility when incorporated into a thermosetting polymer containing system, but when converted becomes an integral part of the system eliminating natural "bleeding" tendencies. It becomes insoluble in the enamel. This unique system produces consistent deep blue-black color regardless of the dispersion method or the vehicle used in the dispersion method providing universal jetness in all automotive enamels. This negates the existing variations in enamel prepared for steel surfaces and elastomeric surfaces that are highlighted on the assembled unit. The coating compositions according to the present invention produce uniformity of color, negating color, gloss and depth variations that typically exist due to type of enamel, type of substrate and application variations related to where the part is sprayed (i.e., assembly plant, part supplier, etc.) and spray equipment used (manual air atomized, turbobell, etc.). The paste, slurry or dispersion, is totally free of thixotrophy and remains fluid with no tendency toward gelling over long periods assuring minimal waste with excellent incorporation in all systems. In all enamels, including high pigment to binder base coats, the fluidity allows an uninhibited levelling of the enamel minimizing gloss and clarity deviations that currently exist due to the deleterious effect conventional jet black pigment dispersions have on some of the same enamel systems.

The coating compositions according to the present invention also have ease of dispersion and durability. Solvent slurries and sand grind dispersions totally eliminate metal contamination. Steel ball mill or attritor dispersions significantly reduce metal contamination due to a 40% to 60% reduction in dwell time (how long composition says in the dispersion equipment) over conventional high color carbon black pigment dispersion. The absence (or reduction) of metal particles also reduces blistering and bronzing by providing a sealed intact film that is totally 100% UV absorbing, free of contaminating particles that can allow moisture and ultraviolet light to reach the primer where enamel deterioration is initiated.

The solubility of the dye eliminates the need of the vehicle to coat and protect the pigment with a hugh surface area. This results in a paste that achieves equilibrium upon completion of the dispersion process. Storage does not yield increased viscosity and no partially coated or insufficiently coated pigment particles can reagglomerate. The enamel produced from this paste is totally void of viscosity variations that require additional solvent additions, fresh or old, and revisions to maintain application efficiency and rheology properties. The net result is a simple, universal jet black paste that produces duplicable maximum super jetness, depth and clarity regardless of the finished enamel system.

Although this invention has been shown and described with respect to detailed embodiments thereof it will be understood by those skilled in the art that various changes in form and detail thereof may be made without departing from the spirit and scope of this claimed invention.

I claim:

1. A super jet black coating composition particularly adapted for use as an automotive paint consisting essentially of a polymer component containing at least about 25% by weight of a thermosetting resin including a cross-linking agent, and a pigment component containing at least about 5% by weight of a 1:2 chromium complex of a mono-AZO dye substituted with aminophenol and coupled with 2-napthol, the composition so constituted that after coating on a substrate and the application of sufficient heat to cure the coating, a durable, super jet black composition with depth, clarity and non-bleeding blackness results.

2. The composition of claim 1 which additionally contains, as the pigment component, up to about 95% by weight carbon black.

3. The composition of claim 1 wherein the thermosetting resin is an acrylic resin.

* * * * *